United States Patent [19]

Sessler

[11] 4,069,901
[45] Jan. 24, 1978

[54] MOMENTUM TYPE ELECTRICALLY CONTROLLED TORQUE PRODUCING DEVICES

[76] Inventor: John A. Sessler, 1600 W. Townline Road, Milton, Wis. 53563

[21] Appl. No.: 701,359
[22] Filed: June 30, 1976
[51] Int. Cl.² .................. F16D 13/18; F16D 27/10
[52] U.S. Cl. .................................. 192/35; 188/70 R; 192/75; 192/84 T
[58] Field of Search .................. 192/35, 36, 84 T, 75, 192/76; 188/70 R, 70 B, 342

[56] References Cited

U.S. PATENT DOCUMENTS

| 2,304,118 | 12/1942 | Phair | 192/84 T X |
| 2,385,906 | 10/1945 | Zeilman | 192/84 T X |
| 2,501,959 | 3/1950 | Oetzel | 192/35 X |
| 3,037,586 | 6/1962 | Modersohn | 192/35 X |
| 3,275,115 | 9/1966 | Timberlake et al. | 192/35 X |

Primary Examiner—Allan D. Herrmann

[57] ABSTRACT

An environmentally protected momentum type, electrically controlled torque producing device consisting of a driving member provided with a multiple of driving shoes with friction lining faces, connecting arms constructed in a manner to hold shoes from engagement with driven member except upon energization of the electrical coil which in turn causes armature to force shoes in an outwardly direction into engagement with the inner periphery of the driven member. Contractile springs are provided to retain driving shoes in the disengaged position while the unit is at zero rotation.

3 Claims, 2 Drawing Figures

MOMENTUM TYPE ELECTRICALLY CONTROLLED TORQUE PRODUCING DEVICES

This invention relates to friction clutches and brakes of the type in which the friction elements, namely the rotating drum and coacting shoes are forced into gripping engagement by an arm, or the like, actuated by rotary torque derived through a pilot friction clutch through the kinetic energy of a rotary part whose motion is to be electromagnetically controlled.

In prior electrically controlled devices of this type, particularily heavy duty, remote controlled clutches and brakes, the pilot clutch friction rings have been anchored to the driven element or drum and the magnet with coil and facing mounted loosely to the driving element.

The general object of this invention is to provide a torque producing device which is simple in design, easy to manufacture, sturdy, and versitile in application. Another object is to provide a rotary torque producing device which provides environmental protection for the electrical and friction elements.

A further object of the invention is to provide a multiple shoe brake or clutch of the above character which is not engagable by the action of centrifugal force. The invention also resides in the novel arrangement of the coil holder and armature which permits the cover of the clutch to become the outer pole and friction material holder of the magnet.

Other objects and advantages of the invention will become apparent from the following detailed description taken in connection with the accompanying drawings, in which.

Figure 1:
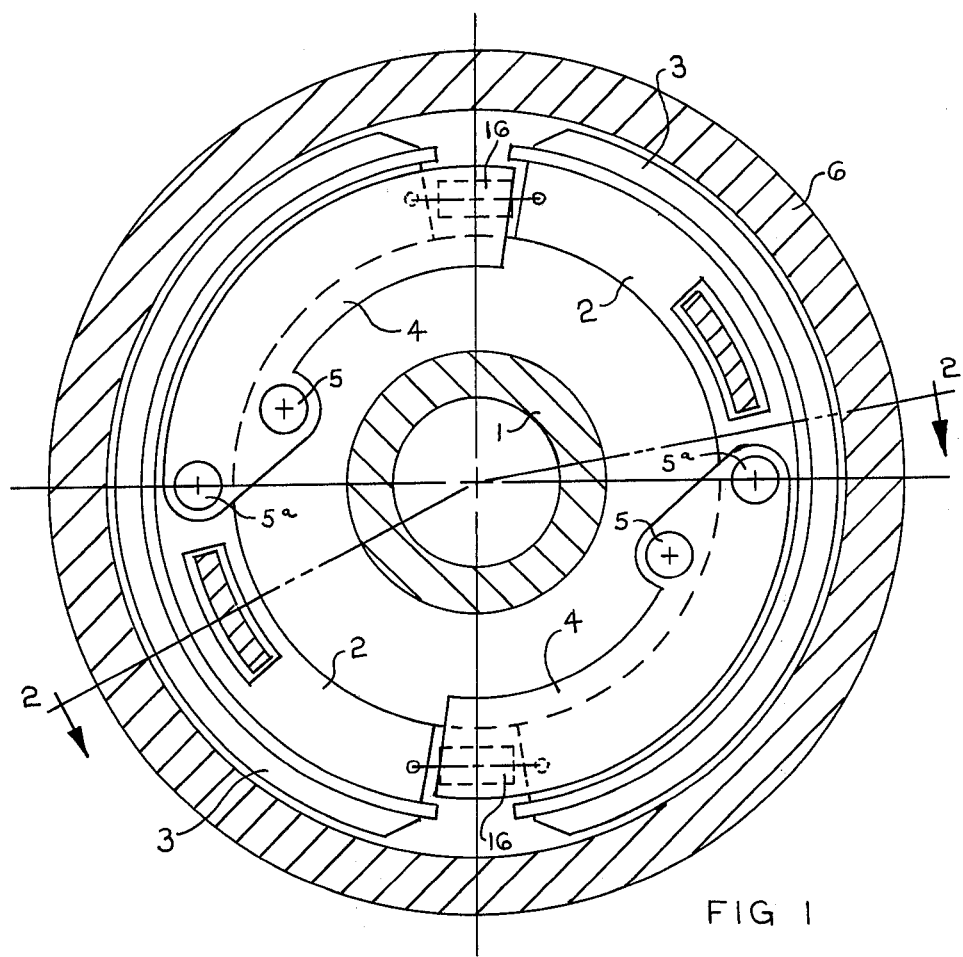
FIG. 1 is a fragmentary diametrical sectional view of a clutch taken along lines 1—1 of FIG. 2 embodying features of the present invention.

For purposes of illustration, the invention is shown incorporated in a clutch of the multiple shoe type consisting generally of a driver 1, rotatable by a prime mover shaft, a multiple of relatively rigid arcuate shoes 2 arranged end to end around the internal surface of the driven drum 6 and adapted to be pressed against the latter by a momentum type actuator including a selectively controllable pilot clutch. As usual a driven member or drum is supported concentrically on the driver 1 by bearings 13 and is adapted to the mounting of driving media such as V pulleys, sprockets or other means, thereon.

While additional shoes may be employed, there are two in the present illustration, each comprising a nearly semi-cylindrical strip, covered by a suitable friction material 3, and attached to the outer edge of a rib in the plane of the center line of the shoe rim. The opposite ends of each shoe 2 which are adjacent and diametrically opposite of each other, have holes located so as to enable the attaching of the ends of contractile springs 16 therein. A pair of eccentrically shaped connecting links 4 pivoted on the driver by pin 5 and in shoe 2 by a pin 5A. One of each of link 4 is placed on either side of shoe 2. Eccentrically shaped connector link 4 are so shaped so as to counteract the centrifugal force on the shoe 2 due to rotation of driver 1 acting on shoes 2. Contractile springs 16 are stretched between ends of shoes 2 to retain same in dissengagement during zero rotation. In the form shown, the pilot clutch consisting of magnet outer pole 7, bearings 8, coil 10, facing material 17, coil holder and inner pole 9, armature 11 and support bearing 12, the magnet lead wires 14 and torque arm 15, derives an actuating torque from the rotation of the driver 1, which in turn rotates armature 11 through projections which are connected loosely to shoes 2 by either holes in the web of the shoe or through contact with the leading end of shoe 2.

Figure 2:
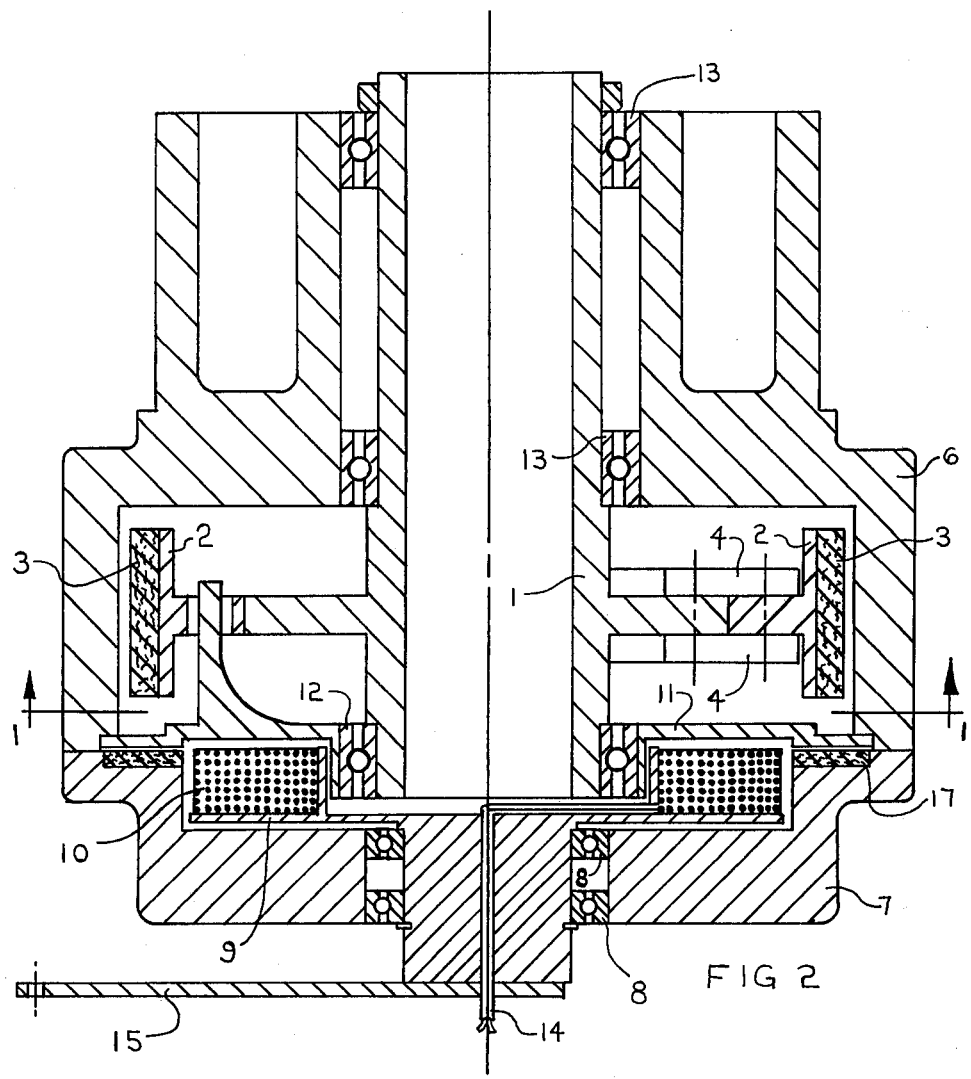
FIG. 2 is a longitudal section view taken along lines 2—2 in FIG. 1.

The armature 11 rotates with driver 1 and shoes 2 and is adapted for axial movement by a loose fitting longitudally moveable bearing 12. The facing surface of the armature 11 is adapted for axial gripping engagement with the opposing face of the rigid magnet pole 7 and facing material 17. The pilot magnet is composed of magnetizable material and is of modified "U" shaped cross section as in FIG. 2, so as to form with the armature 11, a toridial flux path enclosing a winding 10 fastened within the magnet core. Thus, whenever the winding 10 is energized, the armature 11 grips the outer pole 7 and friction material 17 of the magnet outer pole 7 deriving a friction torque tending to drive armature 11 and shoes 2 in the opposite direction of the rotation of driver 1, which in turn forces shoes 2 into engagment with the driven member 6 causing said driven member and driving member 1 to rotate at the same speed and in the same direction. To permit limited rotation as well as axial movement of armature 11, an antifricion bearings 12 is mounted between driver 1 and armature 11. To permit rotation of driven member 6 along with magnet outer pole 7, coil holder 9 is piloted and supported on suitable bearings 8, which maintain axial position and concentricity between coil holder 9 and other component parts of pilot clutch as shown in FIG. 2. To prevent rotation of coil holder 9, which would tend to destroy coil lead wires 14, a torque arm or other restraining means 15 is provided.

Turning of the armature in a direction opposite the direction of rotation of driver 1 and shoes 2 continues until after clearance between shoes 2 and driven element 6 has been taken up and the shoes with friction facings are compressed against the drum under a pressure which is determined by the magnitude of the actuating torque delivered by the pilot clutch. This in turn is proportional to the degree of energization of the winding 10. Until such time as the coil is energized, the shoes are held in the disengaged position by contractile springs 16 and the action of the extended arm portion of links 4, which due to centrifugal force acting upon said arms counteract centrifugal force action on shoes 2. This action causes shoes to remain at rest with the inner diameter of shoe web held inwardly against the rib portion of driver 1 until such time as winding 10 is energized.

From the forgoing description of the preferred form of the invention, it is apparent to those skilled in the art, that many different embodiments of the invention may be made without departing from the scope thereof. Therefore, it is not intended that the invention be limited in spirit and scope except as indicated by the following claims.

I claim as my invention:

1. An improved friction torque producing device for use with a rotary drum, the combination of, a driven member, a driving member mounted to a torque conveying shaft, rigid arcuate shoes arranged in end to end relationship around the outer periphery of said driving member and inside of the inner diameter of said driven member, springs, each stretched between adjacent ends of said shoes and normally urging the same away from engagement with the driven member, eccentrically shaped connecting links, anchored by means of pins or the like located around and parallel to the axis of the driving member and the respective shoes, a pilot clutch comprised of an armature centered about the driving member and driven member, a bearing mounted stationary electrical field and inner pole of a modified "U" shaped magnet, a torque arm holding said electrical field against rotation, an outer pole of said magnet attached to and a part of said driven member, and a coil holder held concentric with driving and driven members by concentrically positioned bearings.

2. An improved friction producing device for use with a rotary drum, the combination of, a driving member, a driven member, rigid arcuate shoes arranged around the outer periphery of the driving member and inside the inner diameter of the drum; springs, each extended between adjacent ends of said shoes and normally urging the same away from engagement with the inner diameter of said drum, eccentrically shaped connecting links connecting said driving member and shoes, normally holding said shoes from engagement with said driven member during rotation, a pilot clutch comprising a bearing mounted armature with projections to engage respective shoes, a stationary magnet inner pole and coil holder for electrical field element, a stationary torque arm, an outer pole of said magnet or field attached to and a part of said driven member, friction facing segments attached to outer pole face of said magnet, insulated electrical coil attached to said stationary inner pole and coil holder.

3. An improved friction producing device in accord with claim 2 wherein driving elements including said driving member, bearings, shoes, and various aforementioned pilot clutch components are all environmentally protected from outside elements.

* * * * *